United States Patent
Lockie et al.

(10) Patent No.: US 11,668,810 B2
(45) Date of Patent: Jun. 6, 2023

(54) BACKSCATTER LOCATION TRACKING SYSTEM AND METHOD

(71) Applicant: Kabushiki Kaisha Toshiba, Minato-ku (JP)

(72) Inventors: Charles Lockie, Bristol (GB); Michael Baddeley, Bristol (GB); Yichao Jin, Bristol (GB); Usman Raza, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 278 days.

(21) Appl. No.: 16/907,364

(22) Filed: Jun. 22, 2020

(65) Prior Publication Data

US 2021/0396865 A1    Dec. 23, 2021

(51) Int. Cl.
*G01S 13/75*   (2006.01)
*G01S 13/931*  (2020.01)
*G01S 13/87*   (2006.01)

(52) U.S. Cl.
CPC .......... *G01S 13/753* (2013.01); *G01S 13/876* (2013.01); *G01S 13/931* (2013.01)

(58) Field of Classification Search
CPC .... G01S 13/753; G01S 13/876; G01S 13/931; G01S 13/82; G01S 13/003
See application file for complete search history.

(56) References Cited

U.S. PATENT DOCUMENTS

| | | | |
|---|---|---|---|
| 9,449,202 B2* | 9/2016 | Clare | G06K 7/0008 |
| 10,587,150 B1* | 3/2020 | Elangovan | G06K 7/10297 |
| 10,873,363 B2* | 12/2020 | Gollakota | H04B 1/40 |
| 2015/0048966 A1* | 2/2015 | Manku | G01S 13/758 |
| | | | 342/51 |
| 2020/0018846 A1 | 1/2020 | Sundaresan et al. | |

OTHER PUBLICATIONS

Lazaro A, Lorenzo J, Villarino R, Girbau D. Backscatter transponder based on frequency selective surface for FMCW radar applications. Radioengineering. Jun. 1, 2014;23(2):632-41. (Year: 2014).*

(Continued)

*Primary Examiner* — Bernarr E Gregory
*Assistant Examiner* — Yonghong Li
(74) *Attorney, Agent, or Firm* — Oblon, McClelland, Maier & Neustadt, L.L.P.

(57) ABSTRACT

A method for locating devices that transmit, backscatter or receive a wireless signal. The method comprising using each of one or more backscatter devices to modulate and backscatter a carrier signal transmitted by a transmitter. Modulating and backscattering the carrier signal generates a backscattered modulated signal comprising a sideband. The method further comprises receiving the one or more backscattered modulated signals with a receiver. At least one of the phase or amplitude of each sideband are used to determine at least one of: the distance between the transmitter and the backscatter device by which that sideband was generated, the distance between the receiver and the backscatter device by which that sideband was generated, and the sum thereof.

15 Claims, 6 Drawing Sheets

(56) References Cited

OTHER PUBLICATIONS

Talla et al., "LoRa Backscatter: Enabling The Vision of Ubiquitous Connectivity", Proceedings of the ACM on Interactive, Mobile, Wearable and Ubiquitous Technologies, 2017, 24 pages.

Daskalakis et al., "Soil Moisture Scatter Radio Networking With Low Power", IEEE Transaction on Microwave Theory and Techniques, vol. 64, 2016, 11 pages.

Talla et al., "Hybrid Analog-Digital Backscatter: A New Approach for Battery-Free Sensing", IEEE International Conference on RFID, 2013, 8 pages.

* cited by examiner

BACKSCATTER LOCATION TRACKING SYSTEM AND METHOD

FIELD

Embodiments described herein relate to methods and systems for locating devices that transmit, backscatter or receive a wireless signal.

BACKGROUND

Backscatter, or scatter radio, systems are low-power low-cost systems communication systems in which a wireless signal is received, modulated and reflected, typically back to the device from which the wireless signal was originally transmitted. Existing backscatter systems operate using digital modulation of received signals to encode information in the backscattered signals.

Some existing localization systems that utilize backscatter operate by detecting the proximity of a transmitter to a backscatter tag due to the presence of a backscattered signal, for example through use of passive RFID tags.

Arrangements of the embodiments will be understood and appreciated fully from the following detailed description, made by way of example only and taken in conjunction with the drawings in which.

DETAILED DESCRIPTION

Figure 1:
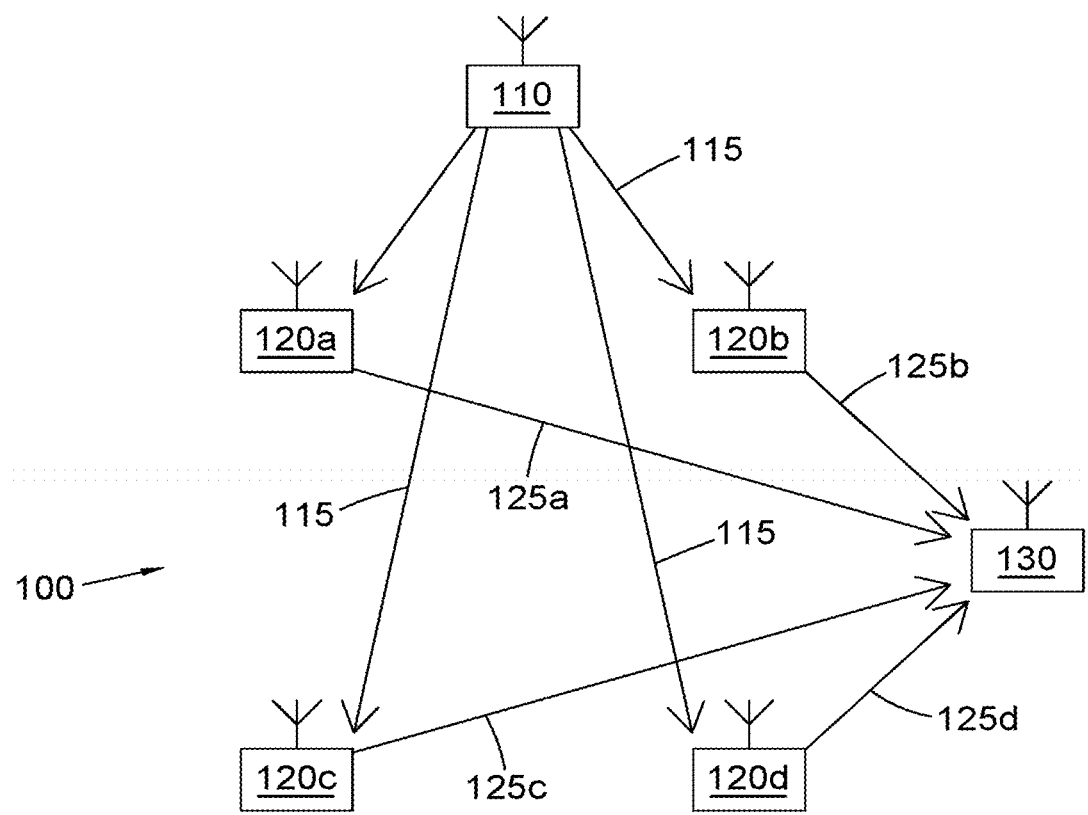
FIG. 1 shows a diagrammatic overview of a transmitter interacting with an embodiment of a system for locating the transmitter.

According to an embodiment there is provided a method comprising: using each of one or more backscatter devices to modulate and backscatter a carrier signal transmitted by a transmitter, wherein modulating and backscattering the carrier signal generates a backscattered modulated signal comprising a sideband; receiving the one or more backscattered modulated signals with a receiver; and using at least one of the phase or amplitude of each sideband to determine at least one of: the distance between the transmitter and the backscatter device by which that sideband was generated, the distance between the receiver and the backscatter device by which that sideband was generated, and the sum thereof.

Embodiments in which the distances between the transmitter and each of the backscatter devices are determined may be used to locate the transmitter and embodiments in which the distances between the receiver and each of the backscatter devices are determined may be used to locate the receiver. Embodiments in which the sum of the distances from each of the backscatter devices to the transmitter and to the receiver are determined may be used to locate the backscatter devices.

The one or more backscatter devices may be a plurality of backscatter devices and each of the plurality of backscatter devices may generate a sideband at a different frequency . . .

The carrier signal may comprise substantially a single frequency and the frequency at which each of the plurality of backscatter devices generates a sideband may differ from the frequency of the carrier signal by an offset frequency dependent upon the identity or location of the backscatter device.

The method may comprise obtaining a cumulative frequency spectrum comprising the frequencies of the backscattered modulated carrier signals received by the receiver. The method may further comprise identifying the peak amplitude within each of a plurality of frequency bands each corresponding to an identity or location of a backscatter device, and may further comprise determining that each peak is a sideband if it exceeds a noise threshold.

Modulating and backscattering the carrier signal may comprise reflecting the signal and analog amplitude modulating the reflected signal by varying the reflection coefficient of an antenna comprised by the backscatter device.

The method may comprise determining the location of the transmitter, each of the one or more backscatter devices, or the receiver using a multilateration method and the determined distances between the transmitter and each of the backscatter devices, the determined distances between the receiver and each of the backscatter devices or the determined sums thereof.

According to an embodiment, there is provided a system comprising: one or more backscatter devices configured to modulate and backscatter a carrier signal transmitted by a transmitter, wherein modulating and backscattering the carrier signal generates a backscattered modulated signal comprising a sideband; and at least one receiver configured to receive the modulated backscattered signals; wherein the system is configured to determine at least one of: the distance between the transmitter and the backscatter device by which that sideband was generated, the distance between the receiver and the backscatter device by which that sideband was generated, and the sum thereof.

The one or more backscatter devices may be a plurality of backscatter devices and each of the plurality of backscatter devices may generate a sideband at a different frequency.

The carrier signal may comprise substantially a single frequency and the frequency at which each of the plurality of backscatter devices generates a sideband may differ from the frequency of the carrier signal by an offset frequency dependent upon the identity or location of the backscatter device.

The receiver may be configured to obtain a cumulative frequency spectrum comprising the frequencies of the backscattered modulated carrier signals received by the receiver.

The receiver may be further configured to identify the peak amplitude within each of a plurality of frequency bands each corresponding to an identity or location of a backscatter device, and may determine that each peak is a sideband if it exceeds a noise threshold.

The one or more backscatter devices may each comprise an antenna and may be configured to modulate and backscatter the carrier signal by reflecting the signal and analog amplitude modulate the reflected signal by varying the reflection coefficient of the antenna.

The system may be configured to determine the location of the transmitter, each of the one or more backscatter devices, or the receiver using a multilateration method and the determined distances between the transmitter and each of the backscatter devices, the determined distances between the receiver and each of the backscatter devices or the determined sums thereof.

According to an embodiment, there is provided an autonomous guided vehicle navigation system comprising a system as described above, and at least one autonomous guided vehicle comprising a transmitter configured to transmit a wireless carrier signal.

FIG. 1 is an overall diagrammatic view of a wireless transmitter 110 interacting with an embodiment of a system 100 for locating the transmitter 110. The illustrated embodiment of the system 100 comprises four backscatter devices or tags 120a, 120b, 120c, 120d (collectively the backscatter devices 120) and a single receiver 130. However, it will be appreciated that other embodiments of the system could instead comprise multiple receivers 130, and/or could comprise two, three, or five or more backscatter devices 120.

The backscatter devices 120 are arranged at different locations in order to allow the location of the transmitter 110 to be obtained from determined distances between the transmitter and a plurality of the backscatter devices 120. The backscatter devices 120 may each be located at a pre-set fixed location, which may be known to the receiver.

Alternatively, one, some, or all of the backscatter devices 120 may instead be moveable. Such backscatter devices are preferably configured to generate sidebands at offset frequencies corresponding to their location in the signals that they modulate and backscatter, such that the receiver is able to derive their location from their backscattered signals.

The system 100 is configured to locate the transmitter 110 when it transmits a wireless carrier signal 115, such as a radio frequency carrier signal. The carrier signal may comprise substantially a single frequency, or a single peak in the frequency spectrum. This single frequency or peak frequency may be referred to as a carrier frequency $f_C$. The carrier frequency $f_C$ need not be any specific frequency and may vary between different successive carrier signal transmissions by the transmitter. The transmitter 110 may transmit the carrier signal 115 when actuated by a user, in response to pre-set conditions or stimuli, and/or at periodic intervals (for example, in order to respect duty cycle limitations).

FIG. 1 shows all four of the backscatter devices receiving the wireless signal 115. However, in other situations and/or embodiments, some of the backscatter devices 120 of the system 100 may not receive the wireless signal 115. For example, some of the backscatter devices 120 may be out of range of, or obstructed from, the transmitter 110, this is more likely in embodiments comprising larger numbers of backscatter devices 120 spread over a larger area. Receiving the signal 115 with a greater number of the backscatter devices 120 may allow the location of the transmitter 110 to be determined more accurately.

The backscatter devices 120 are each configured to receive the carrier signal 115, to modulate the carrier signal 115 to generate a sideband (or a pair of sidebands comprising an upper sideband and corresponding lower sideband) therein, and to backscatter the modulated carrier signal 125a, 125b, 125c, 125d (collectively the backscattered modulated signals 125). The backscattered modulated signals 125 therefore comprise sidebands in addition to, or instead of, the carrier frequency $f_C$.

The sideband or sidebands generated by each backscatter device 120 modulating the carrier signal 115 differ from the carrier frequency $f_C$ by an offset frequency $f_O$. The offset frequency at which sidebands are generated by a backscatter device 120 depend upon the identity and/or the location of that backscatter device 120. The backscatter devices 120 are configured such that different backscatter devices 120 in different locations generate sidebands at different frequencies, and therefore backscatter different modulated signals 125 comprising different sidebands.

The modulation of the carrier signal 115 by the backscatter devices 120 is preferably analog modulation, and more preferably amplitude modulation. The modulation of the carrier signal 115 by each backscatter devices may comprise amplitude modulating the carrier signal 115 with an offset signal with a peak frequency at an offset frequency $f_O$ dependent upon the identity and/or location of that backscatter device 120.

The modulated carrier signal 125 backscattered by the backscatter device therefore comprises sidebands with peak frequencies $f_C+f_O$ and $f_C-f_O$. The separation between each of the sidebands generated by the backscatter device 120 and the carrier frequency therefore equals the offset frequency and correspond to the identity and/or location of the backscatter device 120.

The offset frequency may be the only frequency of the offset signal, such that the sidebands comprise only the frequencies $f_C+f_O$ and $f_C-f_O$. Alternatively, the offset frequency may be the peak frequency of a plurality or band of frequencies comprised by the offset signal, in such embodiments, the sidebands, will also comprise a plurality or band of frequencies with peaks in the frequency domain at $f_C+f_O$ and $f_C-f_O$.

The offset signal may comprise a plurality of signals as a consequence of the method by which the carrier signal is modulated and backscattered. For example, if a carrier signal is modulated and backscattered by switching between a pair of different loads on the end of an antenna of the backscatter device, the offset signal is a square wave corresponding to the varying load and reflectance of the antenna. The square wave offset signal will comprise a peak frequency equal to the rate at which the loads are switched as well as a plurality of other frequencies, and the offset frequency at which sidebands are generated will equal this peak frequency.

The offset frequency $f_O$ with which a backscatter device 120 modulates the carrier signal is dependent upon the identity and/or location of that backscatter device 120. The offset frequency $f_O$ is preferably within a range or band of frequencies corresponding to the identity or location of the backscatter device 120. This may advantageously ensure that the backscatter device 120 that introduced a sideband is able to correctly identified, even if the frequency between the sideband and the carrier frequency varies, for example, as a consequence of drift in the offset frequency of the backscatter device, variations in the carrier frequency, noise, or imprecision in the receiver. The bands or ranges of frequencies assigned to different backscatter devices 120 and/or locations preferably do not overlap so as to ensure that the sidebands generated by different backscatter devices are distinct.

In embodiments, in which one, some of all of the backscatter devices 120 generate sidebands with offset frequencies $f_O$ corresponding to their identities, the receiver is preferably aware of the locations of these backscatter devices, which may be pre-set and fixed. In the event that the system 100 is reconfigured and one or more of these backscatter devices 120 are relocated, the receiver must be updated or informed of the new locations of these backscatter devices 120.

In embodiments, in which one, some of all of the backscatter devices 120 generate sidebands with offset frequencies $f_O$ corresponding to their locations, the offset frequencies $f_O$ of these backscatter devices 120 are preferably updated when they are moved. The offset frequencies $f_O$ may be updated to either automatically, or by a user. For example, in embodiments in which the offset frequency $f_O$ of a backscatter device 120 is dependent upon the resistance of a resistor network comprised by the backscatter device 120, the resistor network may be modified by a user when the backscatter device 120 is moved to a new location such that the resistance corresponds to the new location. Alternatively, backscatter devices 120 may be configured to update their own frequency offsets, for example, upon detecting or being informed of their new location.

The offset frequency $f_O$ of a backscatter device may correspond to one of a plurality of discrete locations between which it may be moved, or may correspond to a specific location within a continuum of possible locations with offset frequencies $f_O$ corresponding thereto. For example, in embodiments in which the offset frequency $f_O$ of a backscatter device 120 is dependent upon the resistance of a resistor network comprised by the backscatter device 120, the resistor network may comprise two resistors with resistances corresponding to X and Y coordinates of the backscatter device 120, thereby producing a total resistance corresponding to the specific location of the backscatter device 120.

Embodiments of backscatter devices 120 and the methods by which they modulate and/or backscatter carrier signals 115 are described in more detail later in the description.

The receiver 130 is configured to receive modulated signals 125 backscattered by the backscatter devices 120 (and may also be configured to receive the carrier signal 115) and to determine the location of the transmitter 110 from the amplitudes and/or phases of the sidebands in the backscattered modulated signals 125 that it receives.

The receiver 130 may be or may comprise a software defined radio (SDR) and/or may be configured process the received signals using software. The receiver may also be considered to comprise processing or computing means in communication with the radio. The receiver 130 is preferably configured to analyse the frequency spectrum of the combination of signals received thereby and may be configured to compute such a frequency spectrum, for example using techniques or algorithms such as the fast Fourier transform (FFT).

The frequency spectrum of the combination signals received by the receiver 130 comprises each of the sidebands introduced by the backscatter devices 120. The plurality of sidebands are preferably distinct peaks within the frequency spectrum.

The receiver 130 is preferably configured to identify sidebands within the frequency spectrum, the frequencies at which they occur, and by extension the identity or location of the backscatter devices by which they were generated. For example, the receiver may identify the maximum amplitude within each of a plurality of bands or ranges of offset frequencies from the carrier frequency that correspond to different backscatter devices 120 or locations thereof. The receiver may then determine if the maximum amplitude within each such band or range exceeds a noise threshold, and if it does, thereby identify that the frequency spectrum comprises a sideband generated by a backscatter device corresponding to that band or a backscatter device at a location corresponding to that band.

The receiver 130 is preferably further configured to determine the distance to the transmitter from each of the backscatter devices 120 that generated a sideband comprised by the frequency spectrum, from the amplitude and/or phase of that sideband. Each of these distances may be determined using a pre-determined relationship between the amplitude and/or phase of that sideband and the distance between the transmitter and the backscatter device 120 by which that sideband was generated (i.e. a backscatter device 120 with the identity, or at the location, corresponding to the frequency of that sideband).

The amplitude and phase of each sideband depends on the total distance travelled by the carrier signal in which that sideband was generated by modulation. This total distance is equal to the sum of the distance between the transmitter 110 and the backscatter device 120 that generated the sideband, and the distance between that backscatter device 120 and the receiver 130.

The distance between the receiver 130 and the backscatter device 120 generating a sideband at given frequency is constant (as the frequency corresponds to the location of the backscatter device, or the frequency corresponds to the identity of the backscatter device and the backscatter device is at a known location). Therefore, the amplitude and phase may be considered to vary with the distance between that backscatter device 120 and the transmitter 110 in isolation.

In some embodiments, the distances between the transmitter 110 and each of the backscatter devices 120 may be determined directly from the amplitude and/or phase of the sideband. These distances may be determined using pre-determined relationships between the amplitude and/or phase of each sideband and the distance between the transmitter and the backscatter device by which that sideband was generated (i.e. a backscatter device 120 with the identity, or at the location, corresponding to the frequency of that sideband). The determination of such a pre-determined relationship is described below with reference to FIG. 5.

Alternatively, the distances between the transmitter 110 and each of the backscatter devices 120 may be calculated from total distances between the transmitter and the receiver 130 via each of the backscatter devices 120. Such total distances being the sum of the distances from that backscatter device 120 to the transmitter 110 and to the receiver and being determined by the receiver 130.

In such embodiments, the receiver 130 may calculate the total distance between the transmitter 110 and the receiver 130 via the backscatter device 120 by which each sideband was generated from the amplitude and/or phase of that sideband. For example, the amplitude may be inversely proportional to the square of the total distance. The receiver may then calculate the distance between the transmitter 110 and the backscatter device 120 by which each sideband was generated by subtracting the known distance between that backscatter device 120 and the receiver 130 from the calculated total distance via that backscatter device 120.

The receiver 130 may determine the location of the transmitter 110 using the determined distances between the transmitter 110 and each of the backscatter devices 120 that generated sidebands comprised by the frequency spectrum.

FIGS. 2a to 2f show example frequency spectra of a carrier signal 115 as emitted by the transmitter 110, of each of four backscattered modulated signals 125a, 125b, 125c, 125d backscattered by the backscatter devices 120, and of the cumulative frequency response of the receiver 130 respectively. The example frequency spectra are those of the situation in which shown in FIG. 1, in which the transmitter 110 emits a carrier signal 115 received by all four backscatter devices 120 from the illustrated location.

Figure 2A:
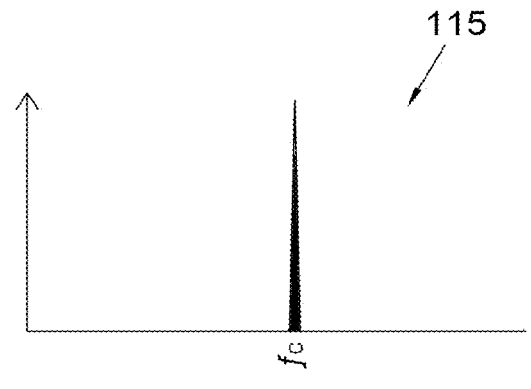
FIG. 2a shows the frequency spectrum of a carrier signal emitted by the transmitter of the system of FIG. 1.

FIG. 2a shows the frequency spectrum of the carrier signal 115 emitted by the transmitter 110 in the arrangement shown in FIG. 1. The transmitter 110 is located closer to the first and second backscatter devices 120a, 120b than the third and fourth backscatter devices 120c, 120d; equidistant between the first and second backscatter devices 120a, 120b; and equidistant between the third and fourth backscatter devices 120c, 120d. The carrier signal 115 comprises only a single peak at a carrier frequency $f_C$.

Figure 2B:
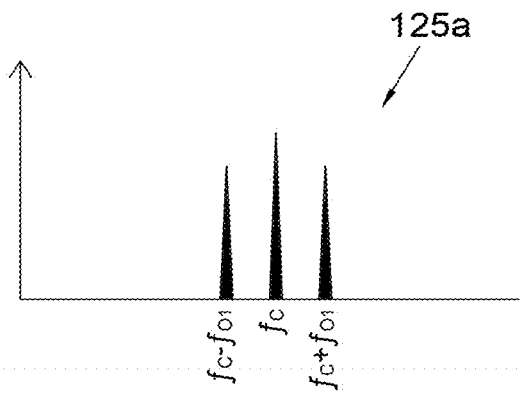
FIG. 2b shows the frequency spectrum of the carrier signal of FIG. 2a modulated and backscattered by the first backscatter device of the system of FIG. 1.

FIG. 2b shows the frequency spectrum of the first modulated backscattered signal 125a backscattered by the first backscatter device 120a. The first backscatter device 120a modulates the carrier signal with a first offset signal at a first offset frequency $f_{O1}$ and therefore the first modulated backscattered signal 125a comprises sidebands at frequencies $f_C+f_{O1}$ and $f_C-f_{O1}$.

Figure 2C:
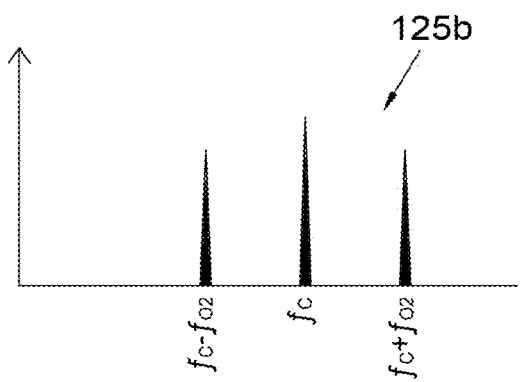
FIG. 2c shows the frequency spectrum of the carrier signal of FIG. 2a modulated and backscattered by the second backscatter device of the system of FIG. 1.

FIG. 2c shows the frequency spectrum of the second modulated backscattered signal 125b backscattered by the first backscatter device 120b. The second backscatter device 120b modulates the carrier signal with a second offset signal at a second offset frequency $f_{O2}$ and therefore the second modulated backscattered signal 125b comprises sidebands at frequencies $f_C+f_{O2}$ and $f_C-f_{O2}$. The first and second backscatter devices 125a, 125b are equidistant from the transmitter 110, therefore, the amplitude with which the second modulated backscattered signal 125b is backscattered is substantially equal to that of the first modulated backscattered signal 125a.

Figure 2D:
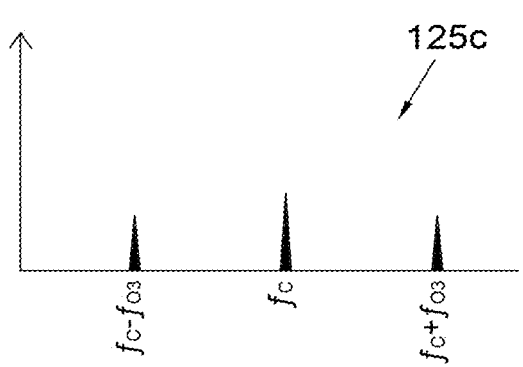
FIG. 2d shows the frequency spectrum of the carrier signal of FIG. 2a modulated and backscattered by the third backscatter device of the system of FIG. 1.

FIG. 2d shows the frequency spectrum of the third modulated backscattered signal 125c backscattered by the first backscatter device 120d. The third backscatter device 120c modulates the carrier signal with a third offset signal at a third offset frequency $f_{O3}$ and therefore the third modulated backscattered signal 125c comprises sidebands at frequencies $f_C+f_{O3}$ and $f_C-f_{O3}$. The third backscatter device 120c is further from the transmitter 110 than the first and second backscatter devices 125a, 125b. Therefore, the amplitude with which the third modulated backscattered signal 125c is backscattered is less than those of the first and second modulated backscattered signals 125a, 125b.

Figure 2E:
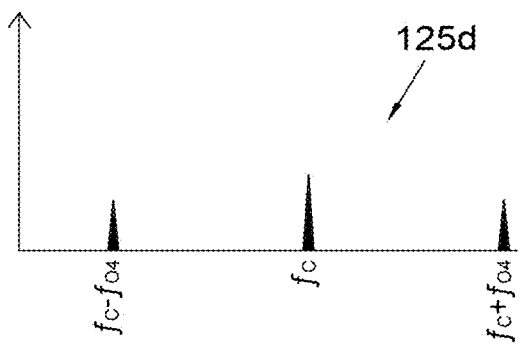
FIG. 2e shows the frequency spectrum of the carrier signal of FIG. 2a modulated and backscattered by the fourth backscatter device of the system of FIG. 1.

FIG. 2e shows the frequency spectrum of the fourth modulated backscattered signal 125d backscattered by the fourth backscatter device 120d. The fourth backscatter device 120d modulates the carrier signal with a fourth offset signal at a fourth frequency $f_{O4}$ and therefore the second modulated backscattered signal 125b comprises sidebands at frequencies $f_C+f_{O4}$ and $f_C-f_{O4}$. The third and fourth backscatter devices 125c, 125d are equidistant from the transmitter 110, therefore, the amplitude of the fourth modulated backscattered signal 125d is equal to that of the third modulated backscattered signal 125c.

The first to fourth offset frequencies $f_{O1}$, $f_{O2}$, $f_{O3}$, $f_{O4}$ are each located within non-overlapping frequency ranges that are assigned and correspond to the first, second, third and fourth backscatter devices 120a, 120b, 120c, 120d. Therefore the receiver 130 is able to identify which of the sidebands where generated by which of the backscatter devices 120. Alternatively, some or all of the frequency ranges may correspond to the locations of the backscatter devices 120 instead of their identities, for example in embodiments in which the backscatter devices 120 are moveable instead of fixed at known locations.

Figure 2F:
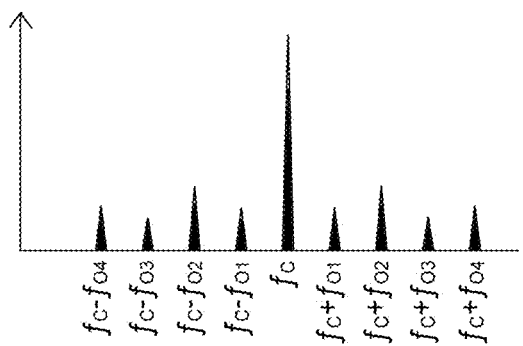
FIG. 2f shows the cumulative frequency spectrum of signals received by the receiver of the system of FIG. 1.

FIG. 2f shows the cumulative frequency spectrum of all the signals received by the receiver 130. This frequency spectrum therefore comprises the sum of the spectra of the first, second, third, and fourth backscattered signals 125a, 125b, 125c, 125d, as received by the receiver 130. This sum may also include the spectrum of the carrier signal 115 as received by the receiver 130. This cumulative spectrum comprises all four pairs of upper and lower sidebands present in the backscattered modulated signals 125a, 125b, 125c, 125d, as well as the carrier frequency.

The amplitude of each sideband in the frequency spectrum is dependent upon the amplitude with which the receiver 130 received the backscattered modulated signal 125 comprising that sideband. This amplitude is in turn is dependent upon the amplitude with which the sideband was generated by the corresponding backscatter device 120, and the distance between that backscatter device 120 and the receiver 130.

The amplitude with which each sideband is generated and backscattered is proportional to the amplitude with which the carrier signal in which it was generated was received by the backscatter device 120 by which it was generated. Therefore, the amplitude of each sideband in the cumulative spectrum is dependent upon the sum of the distance from the transmitter 110 to the backscatter device 120 that generated that sideband, and the distance from that backscatter device 120 to the receiver.

The sidebands at $f_C+f_{O2}$ and $f_C-f_{O2}$ have the greatest amplitude, as the carrier signal was modulated by offset frequency $f_{O2}$ by the second backscatter device 120b, which was close to both the transmitter and the receiver. The sidebands at $f_C+f_{O3}$ and $f_C-f_{O3}$ have the smallest amplitude, as the carrier signal was modulated by the offset frequency $f_{O3}$ by the third backscatter device 120c, which is distant from both the transmitter 110 and the receiver 130. The sidebands $f_C+f_{O1}$, $f_C+f_{O3}$, $f_C-f_{O1}$, and $f_C-f_{O3}$ have substantially equal amplitudes intermediate those of the other sidebands as the backscatter devices 120 by which they are generated are close to one of the transmitter 110 and receiver 130 and distant from the other.

The distance between the receiver 130 and a backscatter device generating at a given offset frequency from the carrier frequency is constant (because the offset frequency corresponds to the identity of a fixed backscatter device or location of a moveable backscatter device). Therefore, there is a relationship between the amplitude of each sideband in the cumulative frequency spectrum and the distance between the transmitter 110 and the backscatter device.

The receiver 130 preferably identifies the sidebands present within the cumulative frequency spectrum. For example, the receiver may identify the peak amplitude within each of a plurality of non-overlapping ranges of frequencies differencing from the carrier frequency by offset frequencies corresponding to different backscatter device identities and locations, and if they exceed a noise threshold, determining that a sideband generated by such a backscatter device is present.

The receiver 130 is preferably aware of pre-determined relationships between the amplitude of a sideband differing from the carrier frequency by a given offset frequency and the distance between the transmitter 110 and a backscatter device 120 generating such a sideband. Such relationships exist because each given offset frequency corresponds to the identify of a backscatter device 120 at a fixed location, or to the location of a backscatter device 120. These pre-determined relationships may be determined during a calibration process such as the process described below with reference to FIG. 6. These pre-determined relationships may be stored on a memory comprised by or in communication with the receiver 130.

The receiver 130 preferably utilizes these pre-determined relationships to calculate the distances between the transmitter 110 and each of the backscatter devices 120 that generated sideband comprised by (and identified within) the cumulative frequency spectrum.

The pre-determined relationships may comprise error or confidence ranges, and the calculated distances between the transmitter 110 and each of the backscatter devices 120 may comprise error or confidence ranges derived therefrom.

The method of the receiver 130 determining the distance between the transmitter and the backscatter devices 120 from the amplitude of the sidebands described above may instead be performed using the phase of the amplitudes and pre-determined relationships between the phase of a sideband differing from the carrier frequency by a given offset frequency and the distance between the transmitter 110 and a backscatter device 120 generating such a sideband. This is possible because the phase of a signal also varies with the distance travelled thereby.

Each distance between the transmitter and one of the backscatter devices 120 corresponds to a ring-shaped area or spherical shell-shaped volume surrounding that backscatter device within which the transmitter may be located. The thickness of the ring-shaped area or spherical-shaped area may be dependent upon the error or confidence range of the determined distance from the backscatter device 120. The transmitter may therefore be determined to be located within the area or volume where the areas or volumes surrounding all of the backscatter devices overlap and intersect. Such a method of locating the transmitter may be referred to as a multilateration method; in the case where areas or volumes are used, the method may be referred to as a trilateration method. An example of a transmitter being located within the overlap of a plurality of ring-shaped areas is described below with reference to FIGS. 3A and 3B.

Figure 3A:
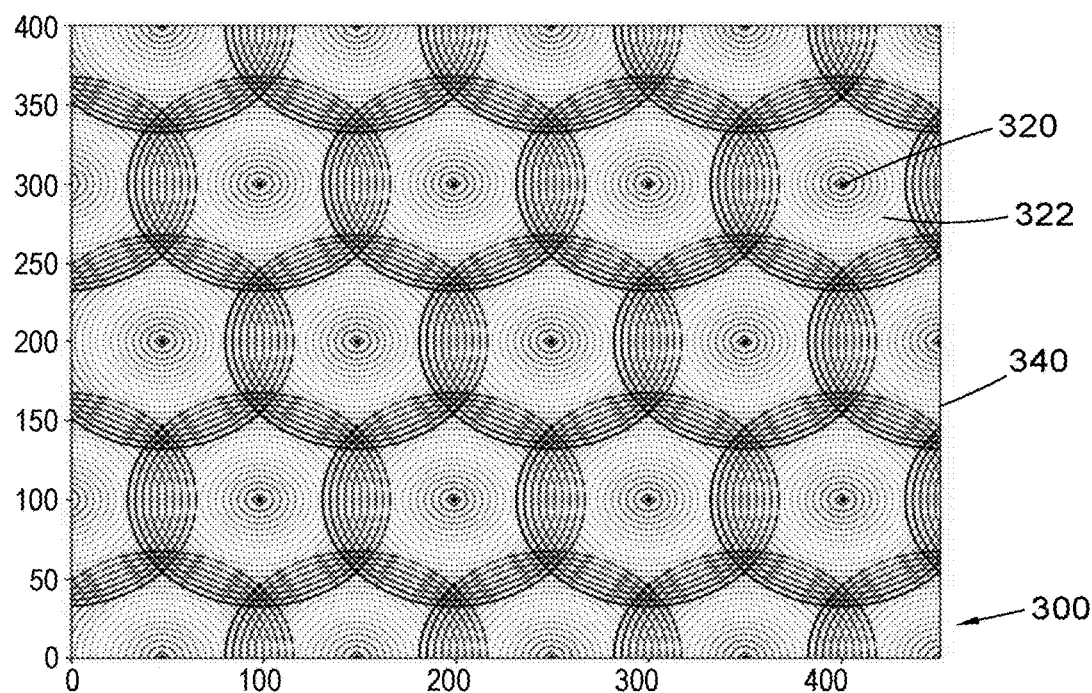
FIG. 3a shows an embodiment of a system for locating a transmitter.
Figure 3B:
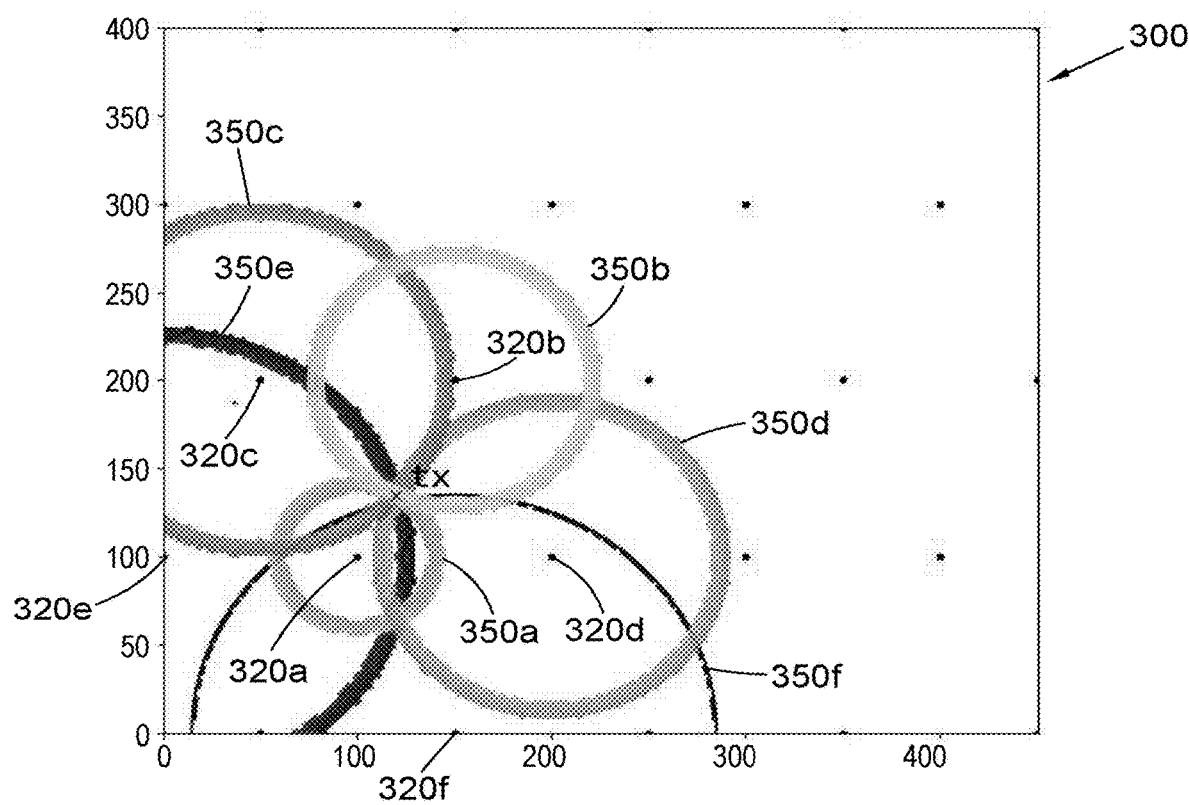
FIG. 3b shows a transmitter interacting with the system of FIG. 3a being located via a multilateration method.

FIG. 3A shows a plan view of an embodiment of a system 300 comprising twenty-five backscatter devices 320 regularly distributed over a 400 cm by 450 cm area 340 such that any point within the area is within 62.5 cm of at least one of the backscatter devices 320 and within 108.33 cm of three or more of the backscatter devices. This arrangement aims to prevent any "dead-zones" where location of transmitter is not possible. In general, the distribution and spacing of backscatter devices of a system will influence the precision with which a transmitter may be located, as well as the position and size of any such "dead zones". The preferably arrangement of backscatter devices may be complicated by the presence of obstacles within the area. Circular regions 322 of radius 137.5 cm are shown centered on each of the backscatter devices 320.

The system 300 further comprises one or more receivers (not shown) arranged to receive a carrier signal backscattered by the backscattered devices.

FIG. 4B shows a plan view of the system shown in FIG. 4a identifying the location of a transmitter 310 using a multilateration technique after a carrier signal has been emitted by the transmitter 310, modulated and backscattered by the six backscatter devices 320a, 320b, 320c, 320d, 320e, 320f closest to the transmitter 310, and received by a receiver (not shown).

Distances between the transmitter 310 and each of the six backscatter devices 320a, 320b, 320c, 320d, 320e, 320f have been calculated from the phase and/or amplitude of the sidebands generated by the six backscatter devices 320 within the cumulative frequency spectrum received by the receiver. These distances, and the error margins thereof define ring-shaped areas 350a, 350b, 350c, 350d, 350e, 350f surrounding the six backscatter devices 320a, 320b, 320c, 320d, 320e, 320f within which the transmitter could be located. The area where the ring shaped areas 350 overlap defines the possible location of the transmitter 310.

The system 300 may comprise a plurality of receivers, which may be distributed across the area 340 covered by the system. The system 300 comprising multiple receivers may reduce the average and/or maximum distance between each of the backscatter devices 320 and the closest receiver. This may increase the probability of the sidebands generated by a backscatter device 320 in a signal modulated and backscattered by that backscatter device 320, exceeding a noise threshold when detected by a receiver.

Multiple receivers of a system may be configured to separately determine the distances between the transmitter 310 and the backscatter devices 320 from which they receive backscattered modulated signals. The receivers may be configured to locate the transmitter 310 independently from these measurements, and/or the distances determined by multiple receivers may be shared and/or collated (for example, such that a receiver may be located even multiple receivers only receive backscattered modulated signals from different pairs of backscatter devices).

The one or more receivers of a system are preferably fixed, alternatively, they may be moveable between a plurality or continuum of locations and may be configured to detect or be informed of their locations.

The systems 100, 300 described above have been described interacting with and locating a single transmitters 110, 310. In some embodiments, the systems 100, 300 may be considered to comprise these transmitters 110, 310. However, the systems 100, 300 may be suitable for locating any transmitter transmitting a carrier signal, or any transmitter transmitting a carrier signal within a range of suitable frequencies. In some embodiments, systems may comprise multiple transmitters which may be configured to transmit carrier signals at different carrier frequencies and/or at different times. In some embodiments, transmitters may be comprised by and/or mounted on moveable objects or vehicles, which may be tracked using the system.

The systems 100, 300 described above comprise fixed receivers 110, 310 and moveable and/or fixed backscatter devices 120, 320. As described above, such systems 100, 300 may be used to locate one or more transmitters 110, 310 by determining the distances between a transmitter 110, 310 and each of a plurality of backscatter devices 120, 320. Such determinations utilize the offset frequency of each sideband corresponding to a known distance between a backscatter device 120, 320 and a receiver 130, and the amplitude and/or phase of that sideband corresponding to the total distance between the transmitter 110, 310 and the receiver 130 via that backscatter device 120, 320.

In other embodiments, systems may be configured to locate one or more moveable receivers and/or moveable backscatter devices. Such systems preferably use of the offset frequency of a sideband to determine the identity or location of the backscatter device that generated that sideband, and use the amplitude and/or phase of that sideband to determine the distance between the receiver and that backscatter device, the distance between the transmitter and that backscatter device, or the sum thereof.

For example, an embodiment of a system may comprise a fixed transmitter, a plurality of fixed and/or moveable backscatter devices, and one or more moveable receivers. As in the systems described above, the offset frequency of each sideband corresponds to identity or location of the backscatter device by which that sideband was generated. Therefore, the offset frequency corresponds to a distance between the backscatter device and the transmitter. As in the embodiments described in detail above, the amplitude and/or phase of a sideband correspond to the total distance between the transmitter and the receiver via the backscatter device that generated that sideband. Therefore, the distances between the receiver and each of a plurality backscatter devices may be determined from the amplitude and/or phase of sidebands generated by those backscatter devices. Such systems may therefore be used to locate the one or more moveable receivers in the same manner as the systems 100, 300 described above locate a transmitter.

Further embodiments for locating one or more moveable receivers may comprise one or more moveable and/or fixed transmitters instead of a single fixed transmitter. In such embodiments, the receiver is preferably configured to identify and/or location of the transmitter that transmits each carrier signal (for example, the one or more transmitters may transmit carrier signals with carrier frequencies corresponding to their location and/or a plurality of different transmitter may transmit carrier signals at different times). The receiver may therefore determine the distance between the backscatter device that generates a sideband and the transmitter of the carrier signal in which the sideband is generated from the frequencies of the sideband and/or the carrier frequency. Such systems may therefore may be used to locate the one or more moveable receivers in the same manner as the systems 100, 300 described above locate a transmitter.

In other embodiments, systems may comprise one or more moveable backscatter devices configured to generate sidebands at offset frequencies corresponding to their identities, a plurality of either transmitters or receivers, and at least one of the other of transmitters or receivers. Such systems may be configured to determine the sum of the distances to a backscatter device from the transmitter and the receiver of each of a plurality of different transmitter-receiver pairs using the amplitude of sidebands generated by that backscatter device in carrier signals transmitted between the transmitter-receiver pairs via that backscatter device. These distances may define ellipse or ellipsoid shaped loci around each of the transmitter-receiver pairs and the backscatter device may be determined to be located at the intersection of these loci. If these systems comprise multiple transmitters, the transmitters are preferably configured to transmit at different carrier frequencies. The one or more transmitters may be fixed or configured to transmit carrier signals with carrier frequencies corresponding to their location, and the one or more receivers may be fixed or configured to detect or be informed of their location.

Figure 4:
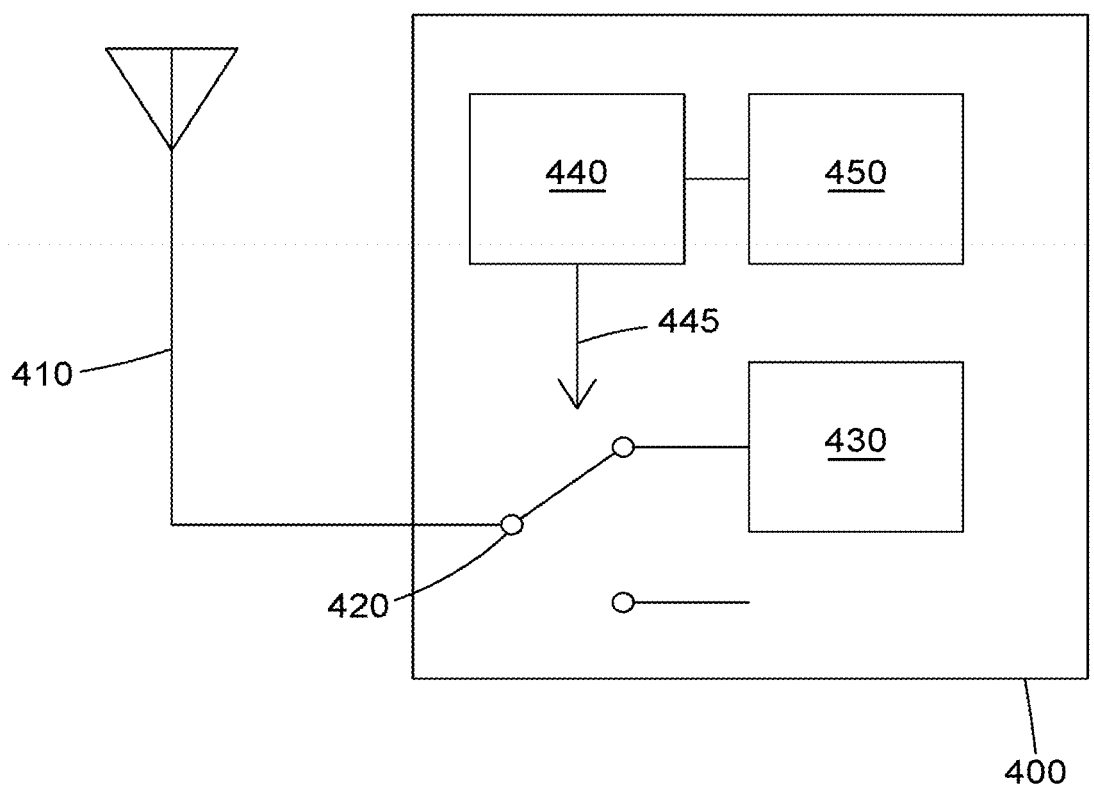
FIG. 4 is a diagram of an embodiment of a backscatter device.

FIG. 4 shows a diagram of an embodiment of a backscatter device or tag 400 for use in backscatter locating systems, such as the systems 100, 300 shown in FIGS. 1 and 3A, or other systems as described above. The backscatter device 400 comprises an antenna 410, a switch 420, an absorptive termination load 430, a programmable oscillator 440, and a resistor network 450.

The backscatter device 400 is configured to receive a carrier signal at a carrier frequency and to backscatter the carrier signal into a modulated signal comprising a pair of sidebands in addition to the carrier frequency, the sidebands being separated from the carrier frequency by an offset frequency $f_O$.

The antenna 410 is configured to receive and backscatter a carrier signal incident thereon. The reflective switch 420 switches the end of the antenna 410 between the absorptive terminator load 430 and an unterminated reflective end in response to an offset signal 445 produced by the programmable oscillator 440. This varies the load on the end of the antenna 410 and by extension varies the reflection coefficient of the antenna 410, thereby varying the amplitude with which the carrier signal is backscattered. The backscattered signal is thereby amplitude modulated by the backscatter device 400, introducing the sidebands.

The switch is switched between at the load 430 and the reflective unterminated end in response to the offset signal 445 generated by the programmable oscillator 440. The offset signal is at the offset frequency $f_O$. The load on the end of the antenna 410, and by extension the reflectance of the antenna 410 with which the carrier signal is amplitude modulated, varies as a square wave whose frequency spectrum comprises the offset frequency $f_O$, and harmonics thereof. Amplitude modulating a carrier signal with single carrier frequency $f_C$ with this square wave mixes the frequencies generating sidebands at frequencies offset from the carrier frequency by the offset frequency, and each of the harmonics thereof, such that the modulated signal comprises frequencies $f_C$, $f_C+f_O$, $f_C-f_O$, $f_O+2f_O$, $f_C-2f_O$, etc. However, the power of the sidebands generated by the first harmonics at $f_C+f_O$ and $f_C-f_O$ are significantly greater than those of the subsequent harmonics and at distances the other sidebands have significantly lower amplitudes and become difficult or impossible to discern.

Alternatively, the backscatter device 400, and/or other backscatter devices comprised by backscatter locating systems described herein, the end of the antenna 410 may be switched or multiplexed between two different non-zero loads, or between three or more different loads (one of which may be a zero load defined by an unterminated end). The end of the reflectance being switched between three or more different may allow the reflectance of the antenna to be varied in multiple steps, for example, a manner more closely approximating a sinusoidal manner than the square wave achieved by only two different loads. In embodiments in which the load and reflectance are varied in multiple steps, the wave defining the variance of the load and the reflectance may comprise fewer harmonics, thereby generating fewer sidebands in addition to those at $f_C+f_O$ and $f_C-f_O$. If the load and reflectance are varied as a sinusoid at $f_O$, only yje sidebands at $f_C+f_O$ and $f_C-f_O$ will be generated.

The offset frequency $f_O$ at which the offset signal 445 is generated by the programmable oscillator 440 is proportional to the resistance of the resistor network 450 coupled thereto. The resistor network is configured to have a specific resistance in order to produce an offset signal with a specific offset frequency $f_O$, for example by changing resistors within the network. Different backscatter devices 400 of a system preferably comprise different resistor networks with different resistances and thereby have different offset frequencies. In embodiments where the offset frequency corresponds to the location of a backscatter device, one or more resistors within the network may be changed when the backscatter device is moved, in order to vary the resistance, and by extension the offset frequency, to correspond to the new location of the backscatter device 400.

In the illustrated example, the programmable oscillator 440 is an LTC6906, which outputs a signal at a frequency $f_O=(1 \text{ MHz}/N) \times (100 \text{ k}\Omega/R_{SET})$ where N is equal to 10, 3, or 1 depending upon whether a DIV input of the oscillator is at a supply voltage, is open, or is at ground respectively. The resistor network 450 is configured to a resistance between 100 kΩ and 1 MΩ. The power use of the oscillator 440 is between to 12 µA and 40 µA. Such a programmable oscillator advantageously has a lower power consumption than other oscillators widely used in backscatter devices such as LM555 timers, which have a higher power consumption in order to allow a frequency output to respond with low latency to changes in external capacitor and resistor networks from which they derive their frequency output. In embodiments which the backscatter device is arranged at a fixed location in use, such a feature is not required, allowing the lower power consumption programmable oscillator 440 to be used.

In alternative embodiments, one, some, or all of the plurality of backscatter devices may use other means to generate offset signals with peak frequency components at desired offset frequencies.

In use, the backscatter device 400 is arranged in a location known to the receiver and modulates received carrier signals with an associated or assigned offset frequency. The receiver is therefore aware of the distance between itself and the backscatter device 400 and is able to identify sidebands generated by the backscatter device 400 by the difference in frequency between those sidebands and the carrier frequency equaling the frequency offset. Different offset frequencies are preferably assigned to the different backscatter devices 400 of a system.

In practice, the separation in frequency between the carrier frequency of a carrier signal and a sideband generated by the backscatter device 400 may vary, for example, as a consequence of drift in the offset frequency of a backscatter device 400, variations in the carrier frequency, noise, or imprecision in the receiver. Therefore, each backscatter device may be assigned or associated with a band or range of offset frequencies instead of a single specific offset frequency. Different non-overlapping bands or ranges of offset frequencies are preferably assigned to different backscatter devices of a system. The backscatter device 400 is configured to generate a {single/peak} offset frequency $f_O$ within that band or range, preferably close to or at the center thereof. The receiver of the system comprising the backscatter devices is configured to identify a sideband with a {single/peak} offset frequency $f_O$ within the range or band of frequencies assigned to or associated with a given backscatter device 400 as being generated by that backscatter device 400.

Alternative embodiments of backscatter devices may be moveable, either between a plurality of locations, or freely. Such backscatter devices may be configured to sense their location, or to be informed of their location (for example by a communicating system or a user), and may be configured to vary the offset frequency of their offset signal to correspond to and/or identify that location using an offset frequency relationship known to the backscatter device and the receiver.

The backscatter device 400 described above is configured to backscatter the carrier signal into a modulated signal comprising a pair of sidebands in addition to the carrier frequency. Alternative embodiments of backscatter devices may be configured to partially or entirely suppress the carrier frequency, and/or to generate only single upper or lower sideband. In embodiments in which the backscatter devices fully suppress the carrier frequency, a receiver receiving the modulated backscattered signal, may be aware of the carrier frequency because it is pre-set may measure the carrier frequency from directly receiving the unmodulated and un-backscattered carrier signal, and/or may calculate the carrier frequency from the midpoint between one or more pairs of corresponding upper and lower sidebands.

Backscatter devices, such as the embodiment 400 described above, advantageously have low power consumption as they merely reflect signals rather than actively transmitting them. Additionally, analogue modulation of a backscattered signal requires less power than digital modulation, further reducing the power consumption of backscatter devices. This may for example, allow a backscatter device to be powered for up to ten years by a single button cell.

Backscatter devices typically have some power requirements in order to perform the modulation of reflected signals; for example, power may be required to operate the oscillator 440 and switch 420 of a backscatter device 400. In some embodiments, backscatter devices may be powered by power harvesting, preferably of incident carrier signals. Such backscatter devices may advantageously be passive unpowered devices, and a system composed of them may be a passive localization system for use with active transmitters.

Figure 5:
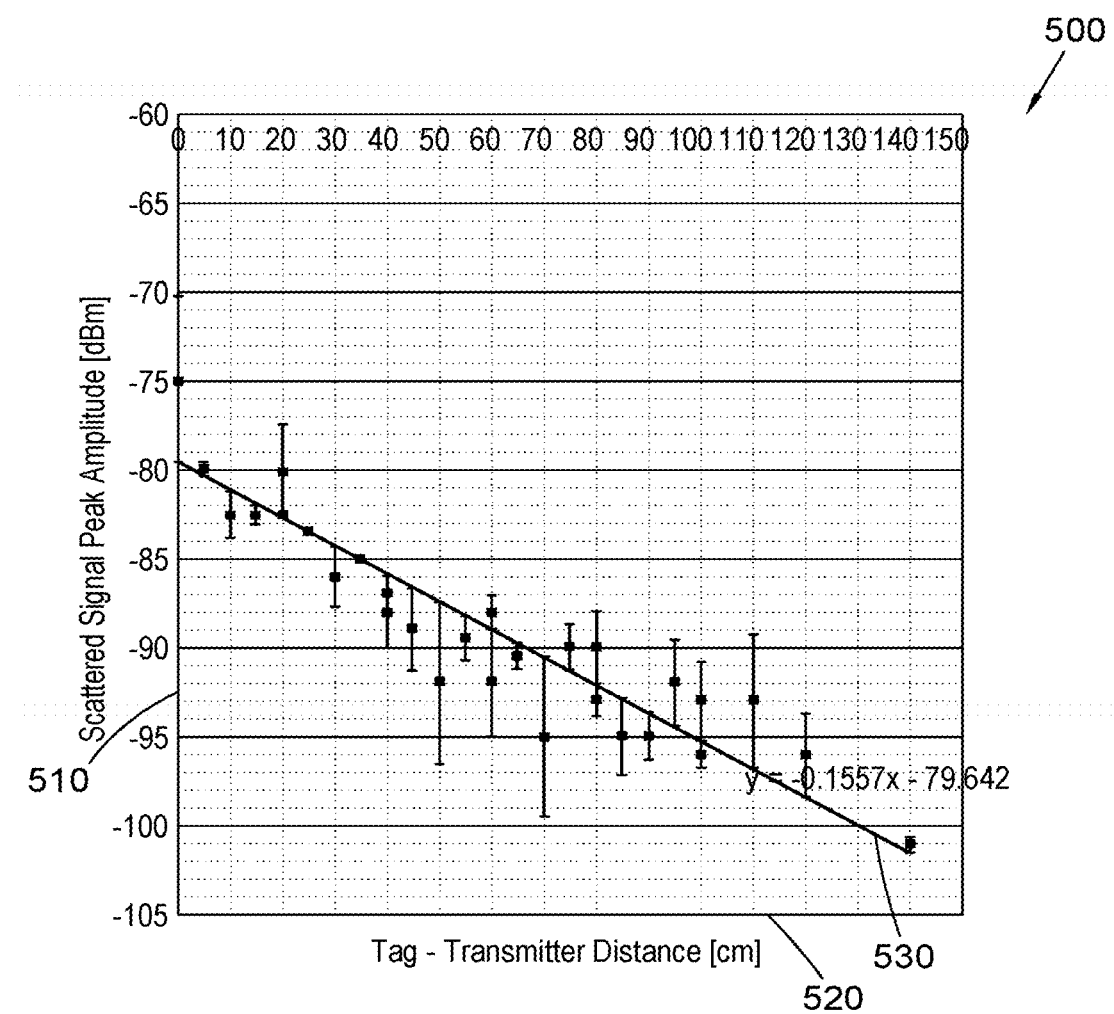
FIG. 5 is a graph of measurements taken to determine a relationship between the distance between a transmitter and a backscatter device distance and the amplitude of a sideband generated by that backscatter device.

FIG. 5 is an example of a graph 500 of measurements taken in order to determine the relationship between a sideband amplitude 510 and a transmitter-backscatter device distance 520. The transmitter-backscatter device distance 520 is the distance between a transmitter of a carrier signal and a backscatter device at a given location. The sideband amplitude 510 is the peak amplitude of a sideband generated by that backscatter device when received by a receiver at a given location relative to that backscatter device.

In order to determine the relationship, measurements of the sideband amplitude 510 are made with the transmitter at a plurality of distances from the backscatter device. FIG. 5 is a graph of these results. A regression analysis on the measurements is performed to obtain a relationship 530 between the transmitter-backscatter device distance 520 and the sideband amplitude 510.

The results shown in FIG. 5 were obtained with a receiver 100 cm away from the backscatter device, and a transmitter at a plurality of distances between 0 cm and 140 cm away from the backscatter device. The offset frequency used by the backscatter device to generate the sidebands was 100 kHz. The peak amplitude of the sidebands was measured in decibel-milliwatts (dBm). The power of the sidebands was less than 1 mW and the amplitudes in dBm are therefore negative. The mean error in the measured amplitudes of the sideband was 1.8895 dBm. This error could be reduced by a more precise measuring setup, or different use of software define radio (SDR) software. Experimentally measuring the amplitude of sidebands generated by the backscatter device with the transmitter at different distances may allow imperfect multipath environments within which the backscatter device is deployed to be accounted for.

A linear relationship 530 between the amplitude and distance is fitted to the measurement results of the graph 500 shown in FIG. 5 using a simple linear regression. In other embodiments, a polynomial regression may be used to obtain a polynomial relationship between the amplitude and the distance.

In some embodiments, the system, or individual backscatter devices thereof, may be periodically calibrated, re-determining the relationships between the distance and the amplitude of sidebands generated thereby. In some embodiments, calibrating may comprise repeating the method of determining a measurement as described above. In other embodiments, calibrating may comprise measuring the amplitude of the sideband when the transmitter is at a single distance from the transmitter (for example, adjacent to the transmitter), measuring the difference between this measured amplitude and an amplitude calculated from this distance of a previously determined amplitude-distance relationship. This difference may then be added to the previously determined relationship at all points (for example, by adjusting the Y-axis intercept of the relationship).

Figure 6:
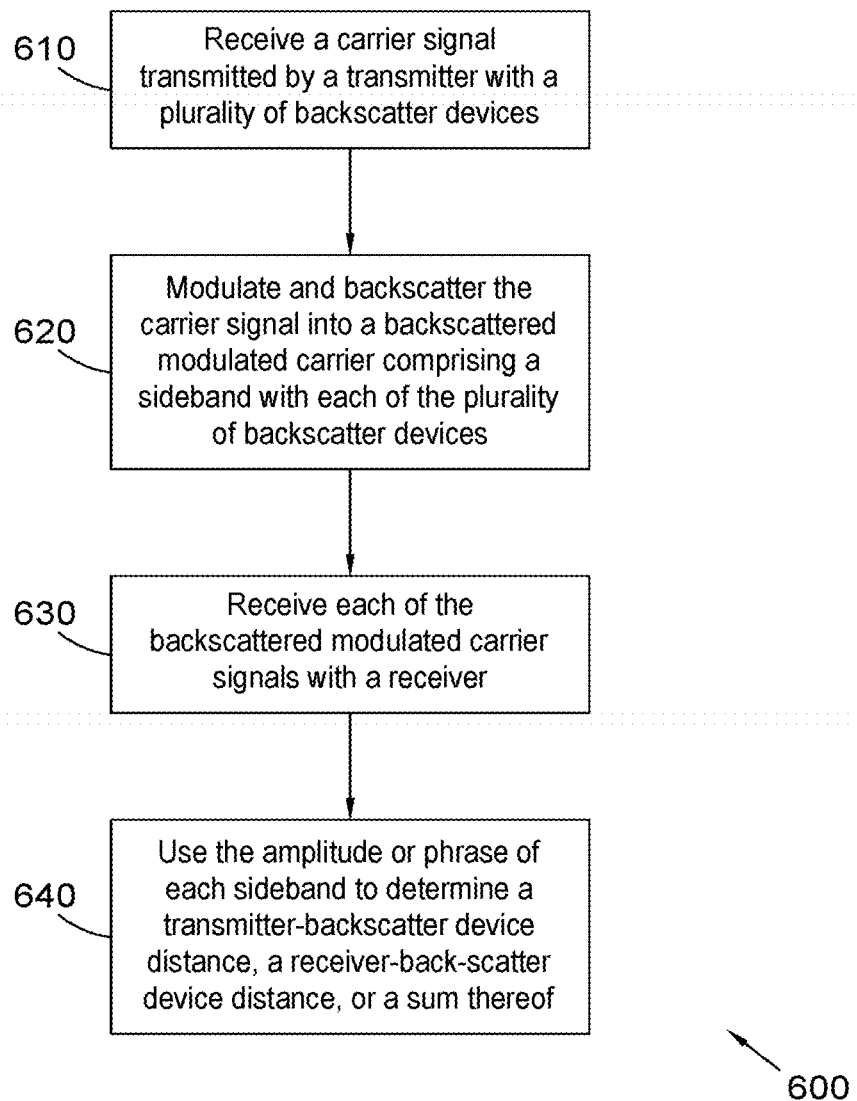
FIG. 6 is a flowchart of an embodiment of locating the source of a carrier signal.

FIG. 6 is a flowchart showing steps of an embodiment of a method for locating the source of a wireless carrier signal.

A first step 610 of the method comprises receiving a carrier signal transmitted by a transmitter with each of a plurality of backscatter devices.

The second step 620 of the method comprises modulating and backscattering the carrier signal into a backscattered modulated carrier signal comprising a sideband with each of the plurality of backscatter devices.

Modulating the carrier signal preferably comprises amplitude modulating the carrier signal with an offset signal comprising one or more offset frequencies. The different backscatter devices may backscatter modulated carrier signals comprising sidebands at different frequencies. The offset signal and frequencies thereof preferably being dependent upon the identity or location of the backscatter device modulating the carrier signal. The modulating and backscattering of the carrier signal may be performed by modulating the reflectance of an antenna comprised by the backscatter device, preferably by varying a load terminating the antenna.

The third step 630 of the method comprises receiving each of the backscattered modulated carrier signals with a receiver.

The method preferably further comprises obtaining the cumulative frequency spectrum of all signals received by the receiver, the cumulative frequency spectrum comprising all of the sidebands generated by different backscatter devices. The amplitudes and/or phases of the sideband generated by each of the plurality of backscatter devices may be used to calculate the distance between the source of the carrier signal and that backscatter device. The location of the source of the carrier signal may be determined from these distances, for example, via multilateration.

The fourth step of the method 640 comprises using the amplitude or phase of each sideband to determine a transmitter-backscatter device distance, a receiver-backscatter device distance, or a sum thereof.

Embodiments of a system or method for locating the transmitter of a carrier signal, such as the embodiments described above, may be utilized and/or comprised by in an autonomous guided vehicle (AGV) navigation system, such as a navigation system for an AGV in a warehouse environment.

In one such embodiment, the plurality of backscatter devices are manufactured as tags in flat packages that are arranged on the floor of the warehouse environment, along routes that the AGV is intended to travel. A transmitter is arranged on, or is comprised by the AGV, and comprises an antenna arranged to illuminate and transmit a carrier signal to backscatter devices arranged on the floor radially surrounding the AGV. As warehouse AGVs travel along straight line routes through the warehouse environment, for example, between shelves, the required density of backscatter devices along these routes is reduced. AGVs that are located using the system may be supplemented with collision avoidance systems, for example, so as to ensure that they travel along the straight line routes along which the backscatter devices are located.

As the backscatter devices are only located on the floor of the warehouse environment, a highly directional antenna may be used in order to increase the power of the radiofrequency carrier signal incident upon the backscatter device. Thereby increasing the power (and by extension, range) of the signals backscattered by the backscatter device. This may also enable the backscatter devices to be powered by radio frequency power harvesting of the carrier signal, allowing the backscatter devices to be passive and unpowered.

One or more receivers in the form of software defined radios (SDRs) are mounted on the ceiling of the warehouse environment; if the warehouse environment is sufficiently large, multiple receivers are used in order to ensure that signals modulated and backscattered by the backscatter devices are received by one or more of the receivers. The one or more receivers (or a system in communication therewith) locate the transmitter (and by extension the AGV) and this location is then transmitted to the AGV using conventional radio methods. If the speed of a located AGV is known, this may be used to supplement the location information determined from the backscattered signals by the system.

Such systems may be used with multiple AGVs. In such embodiments, the systems are configured to prevent modulated and backscattered carrier signals from transmitters on different AGVs overlapping. For example, different transmitters on different AGVs may transmit carrier signals at different carrier frequencies, preferably separated by more than twice a maximum offset frequency. Alternatively, or additionally, different transmitters on different AGVs may transmit carrier signals in different time slots, for example, using methods similar to those of a medium access control (MAC) sublayer.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method comprising:
using a first backscatter device and a second backscatter device, the first backscatter device modulating and backscattering a carrier signal transmitted by a transmitter, the second backscatter device modulating and backscattering the carrier signal, wherein the first backscatter device generates a first backscattered modulated signal including a first sideband, and the second backscatter device generates a second backscattered modulated signal including a second sideband, the first sideband being different from the second sideband in frequency;
receiving, by a receiver, at least one of the first backscattered modulated signal or the second backscattered modulated signal, the first sideband corresponding to a location of the first backscatter device, the second sideband corresponding to a location of the second backscatter device, wherein a distance between the receiver and the first backscatter device is known, and a distance between the receiver and the second backscatter device is known:
  using at least one of a phase or amplitude of the first sideband to determine at least one of:
    a first distance between the transmitter and the first backscatter device, or
    a sum of the first distance and a distance between the receiver and the first backscatter device; and
  using at least one of a phase or amplitude of the second sideband to determine at least one of:
    a second distance between the transmitter and the second backscatter device, or
    a sum of the second distance and a distance between the receiver and the second backscatter device.

2. The method according to claim 1 wherein the carrier signal includes a single frequency and wherein a first frequency at which the first backscatter device generates the first sideband differs from the single frequency of the carrier signal by a first offset frequency dependent upon an identity or location of the first backscatter device, and a second frequency at which the second backscatter device generates the second sideband differs from the single frequency of the carrier signal by a second offset frequency dependent upon an identity or location of the second backscatter device.

3. The method according to claim 1 further comprising:
  obtaining a cumulative frequency spectrum including a first frequency of the first backscattered modulated signal received by the receiver and a second frequency of the second backscattered modulated signal received by the receiver,
  identifying a first peak amplitude within a frequency band corresponding to an identity or location of the first backscatter device or a second peak amplitude within a frequency band corresponding to an identity or location of the second backscatter device, and
  determining that the first peak amplitude corresponds to the first sideband when the first peak amplitude exceeds a first preset noise value, and determining that the second peak amplitude corresponds to the second sideband when the second peak amplitude exceeds a second preset noise value.

4. The method according to claim 1 wherein modulating and backscattering the carrier signal includes reflecting the carrier signal and analog amplitude modulating the reflected carrier signal by varying at least one of a first reflection coefficient of a first antenna or a second reflection coefficient of a second antenna, the first antenna being included in the first backscatter device, the second antenna being included in the second backscatter device.

5. The method according to claim 1 further comprising determining a location of the transmitter, at least one of the first backscatter device, the second backscatter device or the receiver using a multilateration method and at least one of the determined distances between the transmitter and each of the first backscatter device and the second backscatter device, the determined distances between the receiver and each of the first backscatter device and the second backscatter device, or the determined sums thereof.

6. A system comprising:
  a first backscatter device to modulate and backscatter a carrier signal transmitted by a transmitter, wherein the first backscatter device generates a first backscattered modulated signal including a first sideband;
  a second backscatter device to modulate and backscatter the carrier signal transmitted by the transmitter, wherein the second backscatter device generates a second backscattered modulated signal including a second sideband, the first sideband being different from the second sideband in frequency; and
  at least one receiver to receive at least one of the first backscattered modulated signal or the second backscattered modulated signal, the first sideband corresponding to a location of the first backscatter device, the second sideband corresponding to a location of the second backscatter device, wherein a distance between the receiver and the first backscatter device is known, and a distance between the receiver and the second backscatter device is known;
  wherein the system is configured to determine at least one of:
    a first distance between the transmitter and the first backscatter device, or
    a sum of the first distance and a distance between the receiver and the first backscatter device,
    a second distance between the transmitter and the second backscatter device, or
    a sum of the second distance and a distance between the receiver and the second backscatter device.

7. The system according to claim 6 wherein the carrier signal includes a single frequency and wherein a first frequency at which the first backscatter device generates the first sideband differs from the single frequency of the carrier signal by a first offset frequency dependent upon an identity or location of the first backscatter device, and a second frequency at which the second backscatter device generates the second sideband differs from the single frequency of the carrier signal by a second offset frequency dependent upon an identity or location of the second backscatter device.

8. The system according to claim 6 wherein the receiver is configured to obtain a cumulative frequency spectrum including a first frequency of the first backscattered modulated signal received by the receiver and a second frequency of the second backscattered modulated signal received by the receiver,
  wherein the system is configured to identify a first peak amplitude within a frequency band corresponding to an identity or location of the first backscatter device or a second peak amplitude within a frequency band corresponding to an identity or location of the second backscatter device, to determine that the first peak amplitude corresponds to the first sideband when the first peak amplitude exceeds a first preset noise value, and to determine that the second peak amplitude corresponds to the second sideband when the second peak amplitude exceeds a second preset noise value.

9. The system according to claim 6 wherein the first backscatter device includes a first antenna and is configured to modulate and backscatter a first reflected carrier signal by reflecting the carrier signal and analog amplitude modulate the first reflected carrier signal by varying a first reflection coefficient of the first antenna, and
  the second backscatter device includes a second antenna and is configured to modulate and backscatter a second reflected carrier signal by reflecting the carrier signal and analog amplitude modulate the second reflected carrier signal by varying a second reflection coefficient of the second antenna.

10. The system according to claim 6 further configured to determine a location of the transmitter, at least one of the first backscatter device, the second backscatter device or the receiver using a multilateration method and at least one of the determined distances between the transmitter and each of the first backscatter device and the second backscatter device, the determined distances between the receiver and each of the first backscatter device and the second backscatter device, or the determined sums thereof.

11. An autonomous guided vehicle navigation system comprising a system and at least one autonomous guided vehicle,
the at least one autonomous guided vehicle including a transmitter configured to transmit a wireless carrier signal, and
the system comprising:
a first backscatter device to modulate and backscatter a carrier signal transmitted by a transmitter, wherein the first backscatter generates a first backscattered modulated signal including a first sideband;
a second backscatter device to modulate and backscatter the carrier signal transmitted by the transmitter, wherein the second backscatter device generates a second backscattered modulated signal including a second sideband, the first sideband being different from the second sideband in frequency; and
at least one receiver to receive at least one of the first backscattered modulated signal or the second backscattered modulated signal, the first sideband corresponding to a location of the first backscatter device, the second sideband corresponding to a location of the second backscatter device, wherein a distance between the receiver and the first backscatter device is known, and a distance between the receiver and the second backscatter device is known:
wherein the system is configured to determine at least one of:
a first distance between the transmitter and the first backscatter device, or
a sum of the first distance and a distance between the receiver and the first backscatter device,
a second distance between the transmitter and the second backscatter device, or
a sum of the second distance and a distance between the receiver and the second backscatter device.

12. The system according to claim 11 wherein the carrier signal includes a single frequency and wherein a first frequency at which the first backscatter device generates the first sideband differs from the single frequency of the carrier signal by a first offset frequency dependent upon an identity or location of the first backscatter device, and a second frequency at which the second backscatter device generates the second sideband differs from the single frequency of the carrier signal by a second offset frequency dependent upon an identity or location of the second backscatter device.

13. The system according to claim 11 wherein the receiver is configured to obtain a cumulative frequency spectrum including a first frequency of the first backscattered modulated signal received by the receiver and a second frequency of the second backscattered modulated signal received by the receiver,
wherein the system is configured to identify a first peak amplitude within a frequency band corresponding to an identity or location of the first backscatter device or a second peak amplitude within a frequency band corresponding to an identity or location of the second backscatter device, to determine that the first peak amplitude corresponds to the first sideband when the first peak amplitude exceeds a first preset noise value, and to determine that the second peak amplitude corresponds to the second sideband when the second peak amplitude exceeds a second preset noise value.

14. The system according to claim 11 wherein the first backscatter device includes a first antenna and is configured to modulate and backscatter a first reflected carrier signal by reflecting the carrier signal and analog amplitude modulate the first reflected carrier signal by varying a first reflection coefficient of the first antenna, and
the second backscatter device includes a second antenna and is configured to modulate and backscatter a second reflected carrier signal by reflecting the carrier signal and analog amplitude modulate the second reflected carrier signal by varying a second reflection coefficient of the second antenna.

15. The system according to claim 11 further configured to determine a location of the transmitter, at least one of the first backscatter device, the second backscatter device or the receiver using a multilateration method and at least one of the determined distances between the transmitter and each of the first backscatter device and the second backscatter device, the determined distances between the receiver and each of the first backscatter device and the second backscatter device, or the determined sums thereof.

* * * * *